July 7, 1970  R. MARTIN  3,519,917
AUTOMATIC POWER REGULATION USING DIGITAL WAVE FORM
DIVISION OF THE INPUT CYCLIC WAVE FORM
Filed Dec. 4, 1967

INVENTOR.
RICKY MARTIN
BY *Elliott & Pastoriza*
ATTORNEYS

United States Patent Office 3,519,917
Patented July 7, 1970

---

3,519,917
AUTOMATIC POWER REGULATION USING DIGITAL WAVE FORM DIVISION OF THE INPUT CYCLIC WAVE FORM
Ricky Martin, North Hollywood, Calif., assignor to Harry Feick Co. Inc., a corporation of California
Filed Dec. 4, 1967, Ser. No. 687,569
Int. Cl. G05f 5/00
U.S. Cl. 323—22    2 Claims

ABSTRACT OF THE DISCLOSURE

An apparatus is provided for regulating power delivered to a load from a cyclic wave form such as a sine wave all in an automatic manner to assure that the power delivered is constant even though the input sine waves may vary randomly in amplitude. The power itself is controlled in value by passing a consistent fraction of the wave form defined by a pre-selected phase angle which phase angle may be varied to vary the value of the fraction and thus the power delivered. The regulating means detects any random amplitude changes in the input sine wave and generates a regulating signal which changes in value in accord with changes in the amplitude and thus regulating signal in turn varies in time the pre-selected phase angle in accordance with the value of the signal such that the consistent fraction is increased when the amplitude of the wave form decreases and decreases when the amplitude of the wave form increases. The delivered power is thus automatically maintained constant.

---

This invention relates to an apparatus for automatically regulating power supplied by a digital wave form division of an input cyclic wave form such as shown and described in my co-pending patent application Ser. No. 675,385 filed October 16, 1967, now U.S. Pat. No. 3,452,214 and entitled Digital Wave Form Division for Power Control.

In my above referred to co-pending application, there is described a system for delivering power to a load such as the electrodes of an automatic welding machine. As mentioned in this co-pending application, it is extremely important that the particular current applied to the welding electrodes have a consistent value. Further, it is important that this value be adjustable for different types of materials to be welded and that once such a value is selected, it may be repeated at a subsequent time by merely providing the same setting of the controls.

The foregoing is achieved by providing a pulse generating means for generating a series of pulses of frequency constituting an integral multiple of the frequency of an input cyclic wave form such as a sine wave. A counting means is connected to receive these pulses and suitable means are provided for initiating the counting of these pulses at a point in time defined by a consistent phase angle of the cyclic wave form. Any desired total count number may be pre-selected in the counting means such that a control pulse will be derived from the counting means when the counting of the pre-selected number of pulses has been completed. There is thus defined a time interval between the initiation of the counting means and the completion of the counting of the pre-selected number of pulses which time interval is employed to control a switch means in a manner to pass a fraction of each cycle, half cycle, or cycles separated by a consistent number, of the wave form to the load, this fraction being a function of the number of pulses counted. The value of the power passed to the load may be very finely adjusted by varying the number of digital increments determining the selected fraction of the wave form. This variation of the increments is achieved by simply varying the number of pulses counted in the counting means.

In the event a sine wave is employed as the cyclic wave form, the power corresponding to an incremental division of the wave form may be maintained constant by time modulating the pulses to vary their spacing such that the area under the sine wave defined between any two successive pulses is equal to the area between any other two successive pulses. In this way, there is linearity between the number of pulses defining the fraction of the wave form to be passed and the actual power passed to the load.

The foregoing system provides an extremely accurate control of the power. However, should there occur random amplitude changes in the input cyclic wave form such as the sine wave, such random amplitude changes will also be reflected in the fraction of the sine wave form passed to the load and in this respect there is no assurance of the selected power being maintained constant or at a desired level.

The present invention to be desired in this application has as its primary object to provide a novel apparatus for overcoming the above described problem such that the delivered power will be maintained at a desired level even though the input cyclic wave form or sine wave may be subject to random amplitude variations.

More particularly, it is an object to provide an apparatus providing a regulated power to a load derived by passing a pre-selected fraction of a cyclic wave form to the load wherein such power is automatically maintained at a level corresponding to a given amplitude of the input cyclic sine wave even though the amplitude of the sine wave may subsequently vary in random manner all to the end that precise control of current to a given load such as the welding electrodes of an automatic welding machine is consistently assured for a particular setting defining the power.

Briefly, these and other objects and advantages of this invention are attained by utilizing in conjunction with a system wherein power is delivered to a load by passing a pre-selected consistent fraction of a cyclic wave form to the load, a means for detecting any random amplitude changes in the cyclic wave form itself. Such amplitude changes are employed to provide a regulating signal which changes in value in accord with a given function of the changes in amplitude. This regulating signal in turn is utilized to control a pulse delay modulating circuit which receives the control pulses to the switch means utilized to pass the desired fraction of the cyclic wave form to the load. By delaying this control pulse for a time interval which varies with amplitude changes in the cyclic wave form, the fraction of the cyclic wave form delivered to the load is varied in such a manner as to be increased when the amplitude of the wave form decreases and decreased when the amplitude of the wave form increases. The final power delivered to the load can thus be maintained at a desired level which normally would be a constant value for a given phase angle setting defining the desired fraction.

A better understanding of the invention will be had by now referring to one embodiment thereof as illustrated in the accompanying drawings, in which.

Figure 1:
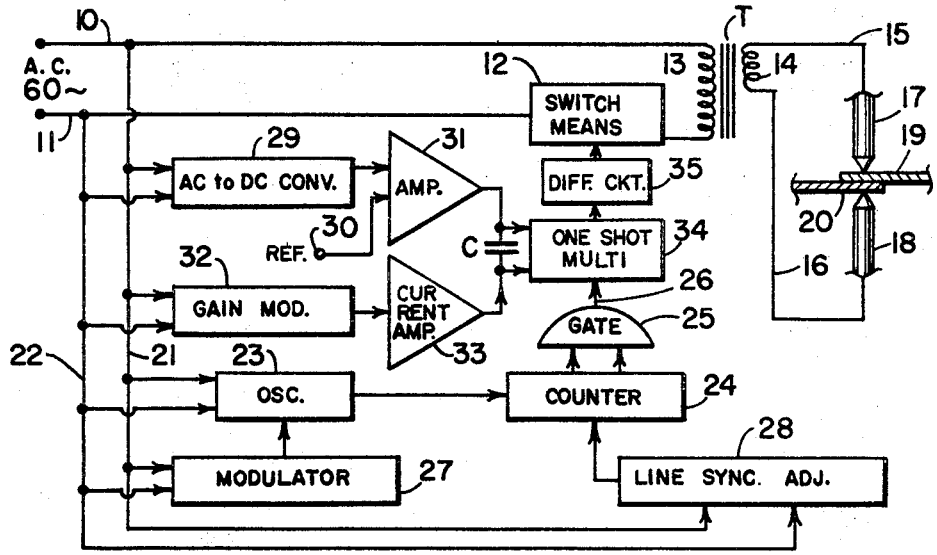
FIG. 1 is a schematic diagram partly in block form illustrating a power control system utilizing digital wave form division incorporating the automatic power regulation apparatus of this invention.

Referring first to FIG. 1 there is illustrated a circuit for digital wave form power control similar to that shown in my referred to co-pending application. Thus, there is provided a conventional A.C. 60-cycle source applied to power lines 10 and 11 connecting through a switch means 12 to the primary 13 of a step-down transformer T. The secondary 14 of this transformer connects through lines 15 and 16 to welding electrodes 17 and 18 positioned to weld together two overlapping members 19 and 20.

When the switch means 12 is closed, power from the A.C. 60-cycle source will be passed through the transformer to the welding electrodes and will effect a welding of the members 19 and 20. Thus, the power delivered to the electrode 17 and 18 is derived from a cyclic wave form which, in the present example, constitutes a 60-cycle sine wave. As in my referred to co-pending application, the invention will hereafter be described in conjunction with a sine wave as provided power to the load in the form of the electrodes 17 and 18. It should be understood however, that the principles of the invention are applicable to any cyclic wave form.

Still referring to FIG. 1, the power passed to the welding electrodes 17 and 18 or any other equivalent load is controlled by the switch means 12. This switch means, as one example, may constitute a silicon control rectifier means responsive to a control pulse to close or assume an "on" state for passing the wave form through the transformer to the load. This type of switch is designated to turn itself off automatically at the cross-over point of the sine wave; that is, when a polarity reversal takes place. In this case, it will be evident that the provision of a control pulse at a given point during the cycle described by the sine wave coupled with the fact that the switch automatically turns itself off at the cross-over point, enables a desired fraction of the wave form to be passed to the load. By varying the point in time of the control pulse to the switch to turn the same on relative to the phase of the sine wave form, this fraction may be varied from zero to the full value of the wave form and thus a very accurate degree of the actual power delivered to the load can be realized.

To provide a control pulse at a selected position in time, a digital division of each half cycle of the sine wave form is achieved by synchronizing through suitable branch leads 21 and 22 the generation of a series of pulses as by an oscillator 23. If the oscillator frequency is twelve kilocycles, there will be one hundred pulses for each half cycle of the sine wave. These pulses are passed to a counter 24 which functions to pass through a gate 25 a control pulse corresponding to a specific count and thus to a specific one of the divisions of the sine wave. This control pulse will be repeated every one hundred pulses and will consistently define a given phase angle of the input sine wave.

In order that the power defined by the fraction of the wave form have a linear relationship with respect to the number of counts set in the counter 24, the pulses generated by the oscillator 23 and counted by the counter may be modulated so that the divisions of the half cycle of the sine wave encompass equal areas. This modulation of the oscillator is accomplished by a modulator 27 synchronized to the branch leads 21 and 22 and operates in the same manner as described in my copending application. Also shown in FIG. 1 is a line synchronizing adjusting circuit 28 coupled to the counter 24 to enable further selective control of the desired fraction of the sine wave involved.

The output control pulse appearing on the output lead 26 from the gate 25, if now pased to the switch means 12 directly as set forth in my co-pending application, will assure a passing of a consistent fraction of the cyclic wave form to the load. However, there is no assurance that the actual power delivered to the load will be consistent should random amplitude changes occur in the cyclic wave form itself appearing on power leads 10 and 11.

In accord with the present invention, such variation in power as results from random amplitude changes is compensated for by suitably delaying the delivery of the control pulse on the output lead 26 to the switch means 12 in such a manner as to change automatically the value of the fraction of the wave form passed to the load such that this fraction will increase for a decrease in amplitude of the cyclic wave form occuring randomly and decrease for an increase in such amplitude. The result is that the power is properly regulated.

The foregoing regulation is achieved by providing an A.C to D.C. converting circuit 29 coupled to the branch leads 21 and 22 to receive the cyclic wave form and generate a D.C. level output signal of value proportional to the amplitude of the input wave form. This signal is passed along with a reference signal applied at 30 to an amplifier 31. A gain modulator 32 is synchronized to the input sine wave from the leads 21 and 22 and provides a modulating signal for a current amplifier 33. The outputs from the amplifier 31 and current amplifier 33 connect across the timing condenser C of at one shot multi-vibrator 34 constituting a pulse delay means. Essentially the output signal from the current amplifier constitutes a regulating current signal whose rate of change is caused to vary periodically by the modulator 32. The output of the one shot multi-vibrator is passed through a differentiating circuit 35 to provide a delayed control pulse to the switch means 12. The time interval of delaying of the control pulse on the output lead 26 is modulated in accord with the random amplitude changes so that the delayed control pulse appearing at the output of differentiator 35 from the one shot multi-vibrator to the switch means 12 will control the switch means in such a manner as to vary the value of the consistent fraction of the wave form passed to the load all as described to effect the desired compensation.

Figure 2:
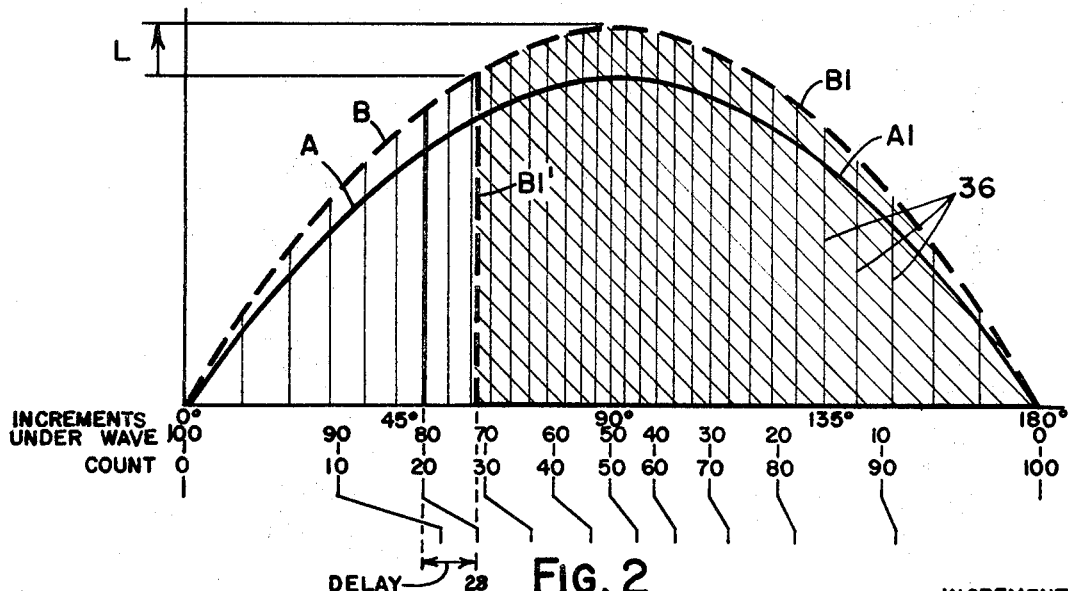
FIG. 2 illustrates exactly one-half cycle of the cyclic wave form used in the system of FIG. 1 showing incremental divisions thereof useful in explaining the operation of the invention.

The foregoing will become clearer and the entire operation of the system will be better understood by now referring to FIG. 2 which illustrates at A one-half cycle of the input sine wave appearing on the leads 10 and 11. The dashed half sine wave designated B shows the appearance of the wave form should a random increase in the amplitude of approximately ten percent occur. The vertical lines 36 illustrate the digital division of the half cycle of the wave form defined by the modulated pulses from the oscillator 23 passed to the counter 24.

In the particular example described, there will be exactly one hundred such divisions spaced in such a manner that the area under the curve between any two successive vertical lines is equal to the area between any other two successive vertical lines. In FIG. 2, only a a few of the division lines are shown to avoid obscuring the drawing. It should be understood however that actually there would be provided one hundred such division lines 36.

Assume initially that the counter 24 of FIG. 1 is set in such a manner that the fraction of the wave form passed to the load in accord with the teachings of my co-pending application is that encompassed within the heavy solid line A1 of the wave form of FIG. 2. This fraction would be defined by eighty increments and the control pulse from the counter 24 is generated at such time as to turn the switch means 12 on at the phase angle corresponding to the eightieth increment counting from the right towards the left of the wave form of FIG. 2 The actual count at the turn on point would thus be 20.

If now the amplitude of the input cyclic sine wave should rise through a value L to the dashed curve indicated at B, the area under the curve would be defined by the heavy curved dashed portion B1 and the vertical portion of the heavy solid line of the curve A1 and this area is greater and thus greater power is passed to the load.

The increase in the power as described above is compensated for by actually decreasing the value of the fraction of the wave form to a value encompassed within the dashed curve B1 and the vertical dashed curve portion B1′ illustrated in FIG. 2. In other words, the time of occurrence of the control pulse is under control of the pulse delay modulator 34 of FIG. 1 such that the area defined within the dashed curve B1 and B1′ is equal to the area defined within the solid heavy line curve A1.

The delay of the control pulse for a given change in the amplitude of the input sine wave will vary depending upon the value of the initial fraction of the wave. Thus, the delay involved where the initial fraction is defined by eighty increments, or at the count of 20, is as indicated in FIG. 2 by the double headed arrow marked delay. If the initial fraction were considerably less such as defined by ten increments, the delay of the control pulse to compensate for the change in amplitude would be considerably less. This is a consequence of the geometry of the sine wave itself.

Figure 3:
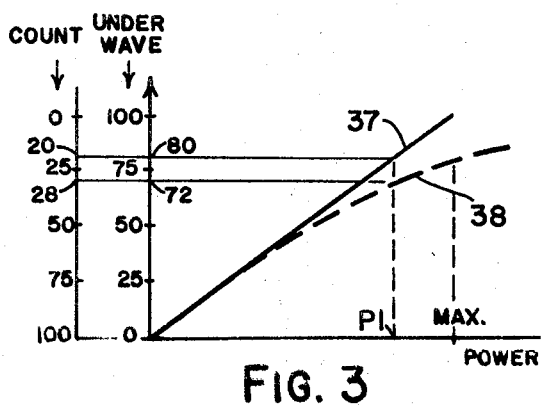
FIG. 3 is a graph showing the relationship of power delivered to numbers of incremental portions of the wave form of FIG. 2; and, FIG. 4 shows a functional relationship between random amplitude variations of the input cyclic wave form and the regulating pulse delay control utilized for regulating the power in the circuit of FIG. 1.

FIG. 3 illustrates at 37 the constant variation of the power with the number of increments defining the consistent fraction. The line 37 is linear for a given amplitude of the sine wave and a given frequency. However, the spacing of the division lines for this given amplitude will not assure linearity if the amplitude is changed without a corresponding change in the frequency or period of the wave form. Thus, for the increased amplitude wave form B of FIG. 2, the relation between the number of increments and the power delivered is indicated by the dashed curve 38 which is not linear.

As a specific example, assuming that the fraction is defined by eighty increments, the power delivered by the fraction under the normal wave form A is shown at P1 in FIG. 3. To assume that this same amount of power P1 is delivered under the conditions of an increased amplitude wave form B, it is necessary that the number of increments be decreased to seventy-two. In other words, the delay of the control pulse must correspond to eight increments as depicted by the double headed delay arrow in FIG. 2.

Figure 4:
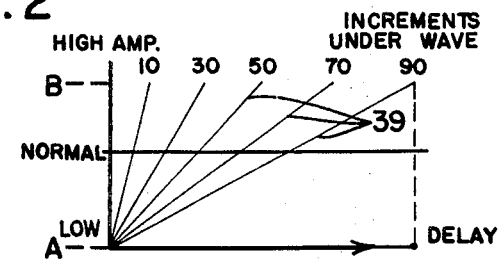

FIG. 4 illustrates at 39 a series of slopes relating the change in the amplitude of the cyclic sine wave and the required delay of the pulses. The output current from the current amplifier 33 will have a rate of change defined by one of the slopes 39 depending upon the number of increments under the wave; that is, the particular phase angle of triggering of the switch means. Once the operating slope is determined, the delay for a given amplitude change will be indicated on the abscissa scale.

Referring once again to FIG. 1, any change in the random amplitude as described, is detected in the converter circuit 29 and compared to a reference signal on the lead 30, the output of the amplifier 31 constituting a D.C. level which changes in accord with the changes in amplitude of the input sine wave. The regulating current signal at 33 follows the functional relationship defined by the various slopes 39 in FIG. 4 in such a manner that the discharge of the timing condenser C is controlled to effect the delay in the output pulse to the switch 12 to the time depicted in FIG. 2. As a consequence, the fraction of the wave form passed to the load is varied in accordance with original random amplitude changes of the input cyclic sine wave in the manner described.

Should a decrease in the amplitude of the input cyclic sine wave occur from the increased value shown at B, the occurrence of the control pulse in time would be less delayed accordingly. In this respect the curves A and B represent the outside limits of amplitude variations.

From the foregoing description, it will thus be evident that the present invention has provided a unique automatic power regulating system wherein the various objects set forth are fully realized.

What is claimed is:

1. An apparatus for regulating the power delivered to a load from a cyclic wave form wherein switch means are provided for connecting said cyclic wave form to said load only during discrete time intervals defined by a control pulse periodically applied to said switch means at a point in time defined by a consistent preselected phase angle of said cyclic wave form, and wherein said cyclic wave form is subject to random amplitude changes, comprising: regulating signal generating means connected to receive said cyclic wave form and provided a control current siganl whose value varies in accord with a given function of changes in said amplitude; and pulse delay modulating means connected to receive said control pulse and delay said pulse from reaching said switch means, said pulse delay modulating means including a one shot multi-vibrator having a timing condenser and means for passing a D.C. signal to said multi-vibrator of value proportional to the amplitude of said input cyclic wave form; and means for passing said control current signal to said condenser to control the discharge time thereof, whereby the delay of said control pulse by said one shot multi-vibrator varies in accord with a function of changes in said amplitude and as a function of the value of said consistent preselected phase angle such that the power passed to said load is maintained at a desired level.

2. An apparatus according to claim 1, in which said desired level is substanially constant.

References Cited

UNITED STATES PATENTS

| | | |
|---|---|---|
| 3,146,392 | 8/1964 | Sylvan. |
| 3,226,627 | 12/1965 | Fromkin. |
| 3,265,955 | 8/1966 | Brown _____ 323—34 X |
| 3,341,769 | 9/1967 | Grant. |

LEE T. HIX, Primary Examiner

G. GOLDBERG, Assistant Examiner

U.S. Cl. X.R.

219—497, 501; 307—96, 133, 297; 323—34, 38